Sept. 7, 1965 S. R. PALOWSKY 3,204,549
COOKING MACHINE
Filed Oct. 31, 1963 3 Sheets-Sheet 1
FIG. 1
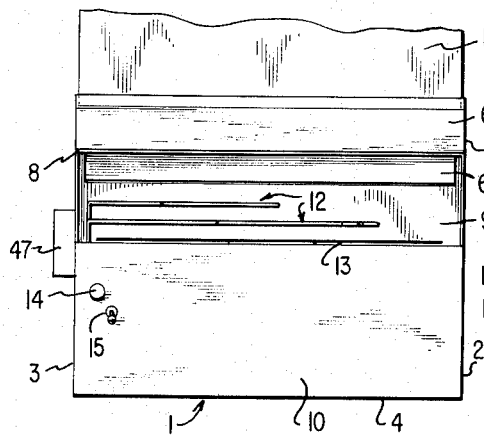
FIG. 2
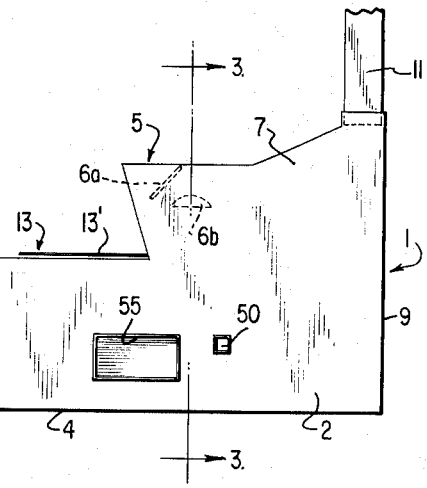
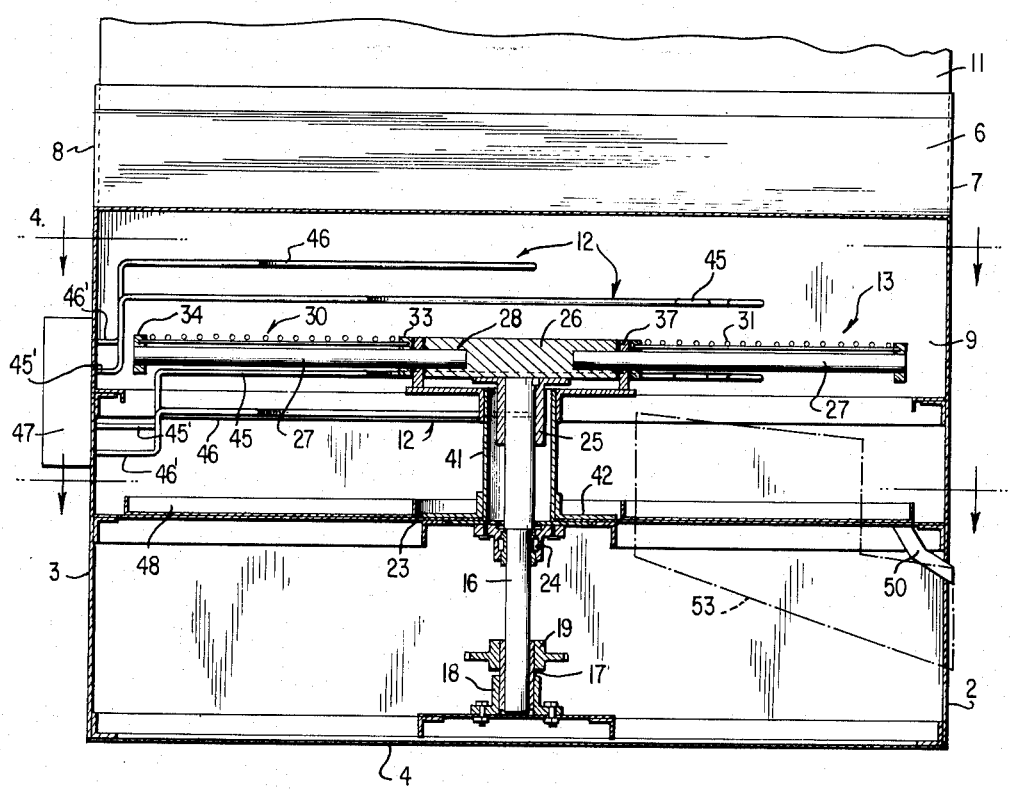
FIG. 3
INVENTOR.
STANLEY R. PALOWSKY
BY
Gardner J. O'Boyle
ATTORNEY Sept. 7, 1965 S. R. PALOWSKY 3,204,549
COOKING MACHINE
Filed Oct. 31, 1963 3 Sheets-Sheet 2

INVENTOR.
STANLEY R. PALOWSKY
BY
Gardner J. O'Boyle
ATTORNEY

Sept. 7, 1965    S. R. PALOWSKY    3,204,549
COOKING MACHINE
Filed Oct. 31, 1963    3 Sheets-Sheet 3

INVENTOR.
STANLEY R. PALOWSKY
BY
*Gardner J. O'Boyle*
ATTORNEY

United States Patent Office 3,204,549
Patented Sept. 7, 1965

3,204,549
COOKING MACHINE
Stanley R. Palowsky, 103 Somerset Drive, Monroe, La.
Filed Oct. 31, 1963, Ser. No. 320,479
4 Claims. (Cl. 99—391)

This invention relates to a cooking machine, and more particularly to a cooking machine of the rotary grid type adapted for the preparation of foodstuffs in large quantities.

The cooking machine of the present invention comprises essentially, a rotary food carrying surface positioned between upper and lower heating elements, said food carrying surface including a plurality of spokes connected to a rotary hub, and a grid segment pivotally connected to each spoke. The machine also includes cam means for maintaining the grid segments in a horizontal plane during a predetermined travel of the rotating food carrying surface, said cam means allowing each grid segment to pivot at a selected position in the travel of the rotating food carrying surface to thereby drop the cooked foodstuff from the grid into a conveyor chute. Grid clearing and cleaner scrapers are positioned in proximity to the food carrying surface for removing any foodstuff which might cling to the grid after it has passed the discharge position, and to clean each grid after the foodstuff is removed therefrom prior to the placing of an uncooked foodstuff thereon. The cooking machine also includes a grease pan, having a grease discharge duct, positioned beneath the rotary food carrying surface for collecting grease drippings from the foodstuffs and conveying the accumulated grease from the machine.

An object of the invention is to provide an improved cooking machine having a rotatably mounted food supporting surface positioned between upper and lower heating elements such that when a foodstuff is placed on the rotatable surface it is either cooked or heated during one revolution of said rotatable surface, whereby large quantities of foodstuffs can be prepared.

Another object of the invention is to provide an improved cooking machine having a rotatably mounted food carrying surface formed by a plurality of grid segments so constructed and arranged that each grid segment is selectively actuated at a predetermined point in the travel of the rotatable food carrying surface to thereby discharge a cooked foodstuff from the respective grid segment.

Yet another object of the invention is to provide an improved cooking machine having a rotatably mounted food carrying surface wherein a scraper assembly is provided in proximity to the food carrying surface for clearing a foodstuff from the surface and for cleaning the surface after the cooked foodstuff has been discharged therefrom.

Still another object of the invention is to provide an improved cooking machine having a rotatably mounted food carrying surface wherein a grease pan, having grease discharge ducts, is positioned beneath the rotatable food carrying surface for collecting grease drippings from the foodstuff and conveying the accumulated grease from the machine.

A further object of the invention is to provide an improved cooking machine characterized by simplicity in design and which is compact, strong and rugged in construction and having few moving parts, to thereby prevent the machine from getting out of order even after long and continued use.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions which, for the purpose of explanation, have been made the subject of illustration.

In the drawings:

FIGURE 1 is a front elevational view of the cooking machine;

FIGURE 2 is a side elevational view of the machine;

FIGURE 3 is an enlarged front elevational view of the machine partially in section;

Figure 4:
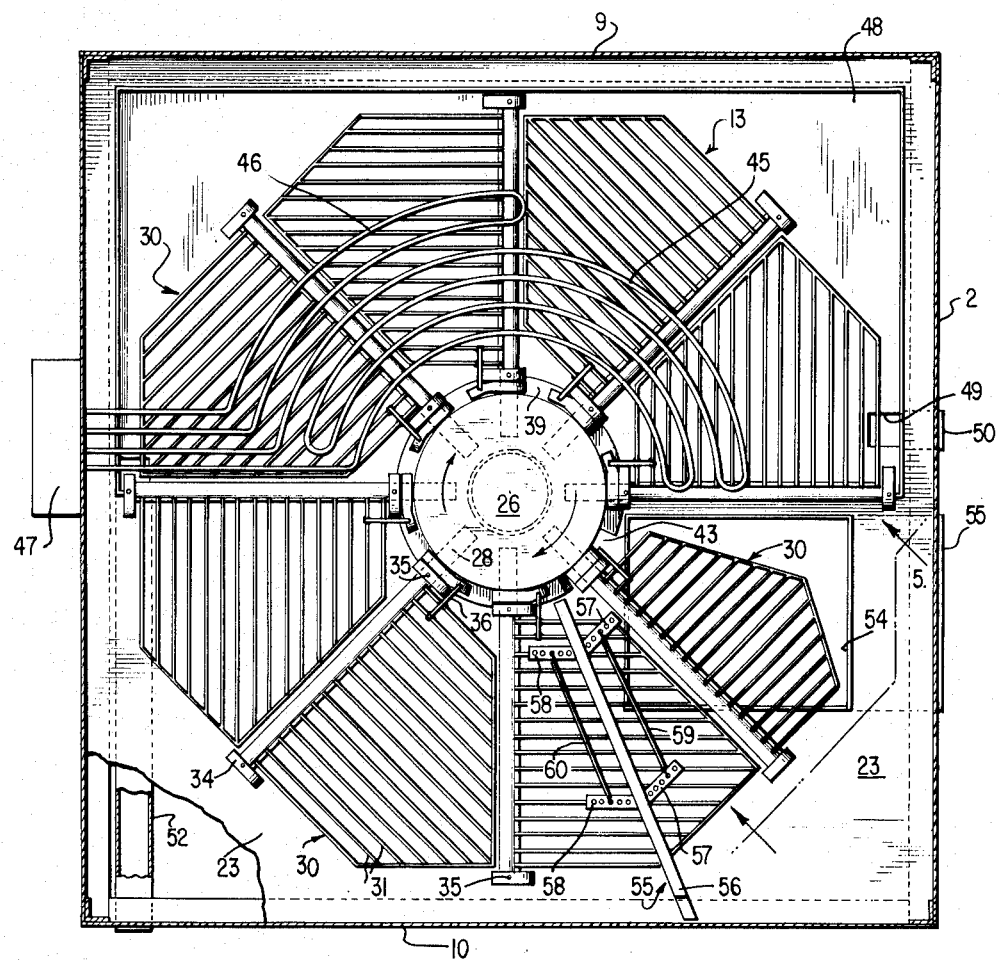
FIGURE 4 is a top plan view of the machine taken along line 4—4 of FIGURE 3.

Referring to the drawings and more particularly to FIGURES 1, 2 and 3 thereof, the cooking machine of the present invention includes a housing 1 formed by a pair of side walls 2 and 3 interconnected by a bottom wall 4 and a hood member 5, the hood being formed by a transversely extending member 6 interconnecting upwardly extending portions 7 and 8 on the side walls, said transversely extending member being provided with a depending heat shield 6a and a heat reflector 6b. To complete the housing structure, a rear wall 9 extends between the hood 5 and bottom wall 4, and a front panel 10 extends between the side walls 2 and 3. To facilitate the removal of smoke and other gases generated by the foodstuff while being cooked, an exhaust duct 11, having an exhaust fan (not shown) is provided at the upper end portion of the rear wall 9, said duct being in communication with the hood 5.

A plurality of heating elements 12 are positioned above and below a rotary food carrying surface 13 mounted within the hood, said food carrying surface having a portion 13' extending outwardly from said hood. A suitable rheostat control knob 14 for controlling the speed of rotation of the food carrying surface, and an off-on switch 15 for energizing the heating elements are carried by the front panel 10.

Figure 6:
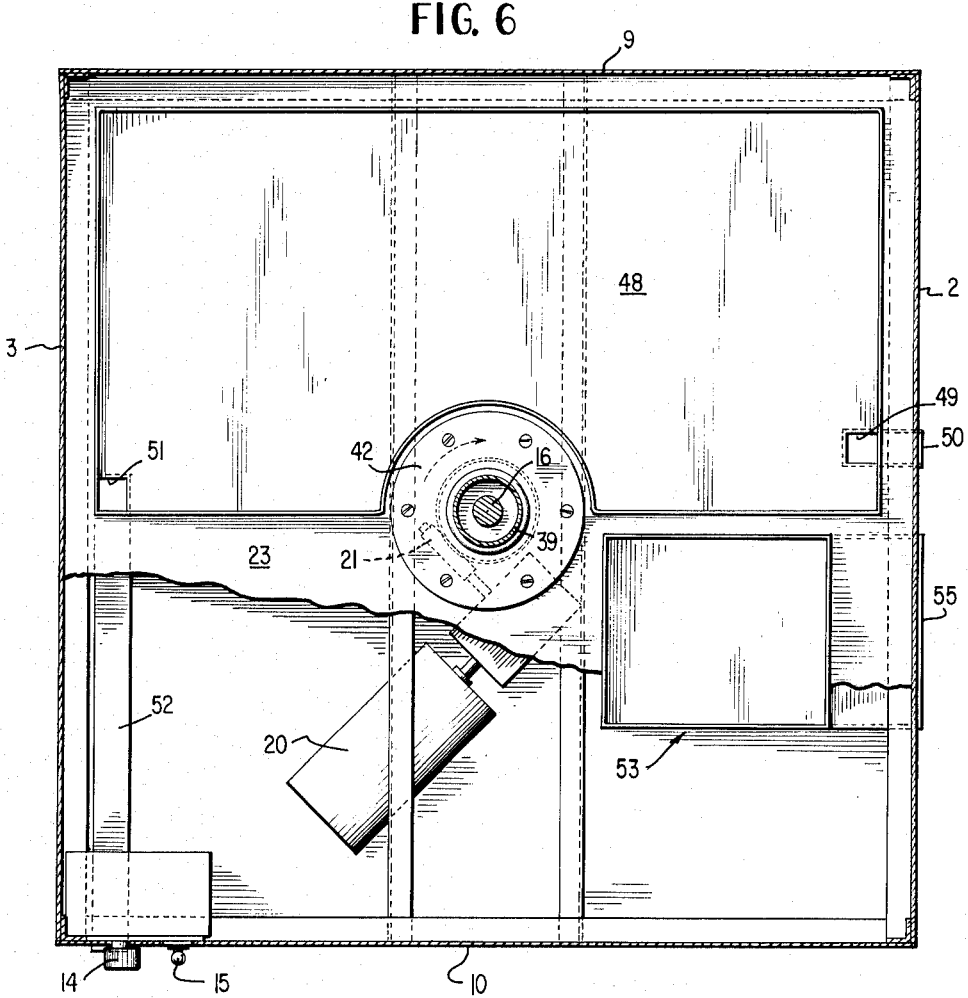
FIGURE 6 is a top plan view taken along line 6—6 of FIGURE 3.

As will be seen in FIGURES 3 and 6, the food carrying surface 13 is rotated by means of a vertical drive shaft 16 having its lower end 17 journaled in a bearing 18 carried by the bottom wall 4. A pinion gear 19 is secured to the lower end of the shaft adjacent the bearing and is connected to a motor 20 (FIGURE 6) through a worm gear 21 and a suitable reduction gear 22 carried by the bottom wall 4 of the housing. The drive shaft 16 extends upwardly through a partition 23 mounted in the housing and is journaled in suitable bearing means 24 carried by said partition, the upper end of the shaft being provided with a sleeve 25 to which a hub member 26 is secured. It will thus be seen that when the motor 20 is energized the drive shaft 16 and associated hub 26 will be rotated in a clockwise direction as indicated by the arrow in FIGURE 4.

The rotatable food carrying assembly comprises a plurality of circumferentially spaced, radially extending spoke members 27, each spoke having its inner end positioned within a radial bore 28 (FIGURE 7) formed in the hub member 26 and secured therein by means of a pin or set screw 29. A grid segment 30, formed by a plurality of interconnected stainless steel rods 31, is connected to the trailing edge of each spoke member by means of a stringer 32 having its inner and outer ends pivotally connected, as at 32', to a pair of collars 33 and 34 secured to the inner and outer ends respectively, of the spoke by means of a set screw 35. By the construction and arrangement of the grid segments pivotally connected to the collars 33 and 34 carried by the spokes, the trailing edge of each grid segment is disposed in proximity to the next succeeding spoke member and form therewith a substantially continuous, co-planar food supporting surface 13, as shown in FIG. 3. Each of the grid segments being adapted to pivot out of a horizontal plane about its respective spoke member, as will be described more fully hereinafter.

Figure 7:
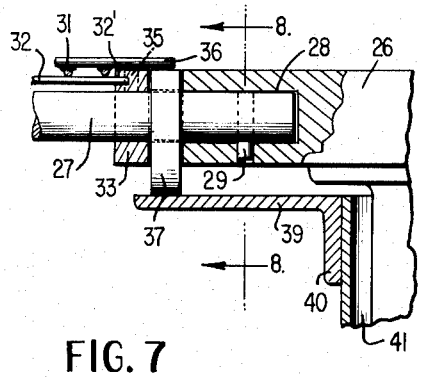
FIGURE 7 is an enlarged fragmentary view, partially in section, showing the inner peripheral portion of the rotary food carrying surface and associated cam means.
Figure 8:
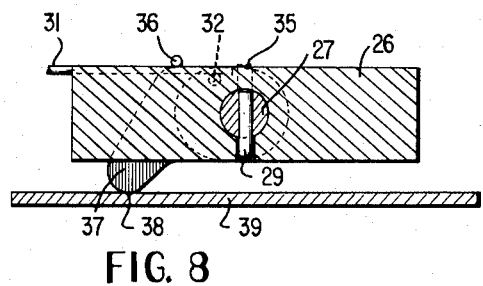
FIGURE 8 is a view taken along line 8—8 of FIGURE 7.

Referring to FIGURES 4 and 7, each of the grid segments 30 is provided with a radially extending finger 36 having one end rigidly secured to the grid rods 31 and the opposite end engaging the upper surface of a cam follower 37 journalled to the spoke between the peripheral edge of the hub 26 and the collar 33. As will be seen in FIGURE 8, the cam follower is in the form of a depending finger having its lower edge portion 38 in abutting engagement with the upper surface of a cam ring 39 having an integral flange portion 40 secured to the upper end portion of a tubular member 41. The tubular member being in concentric relationship with the drive shaft 16 (FIGURE 3) and having its lower end secured to the partition 23 by means of a flanged disc 42.

Figure 5:
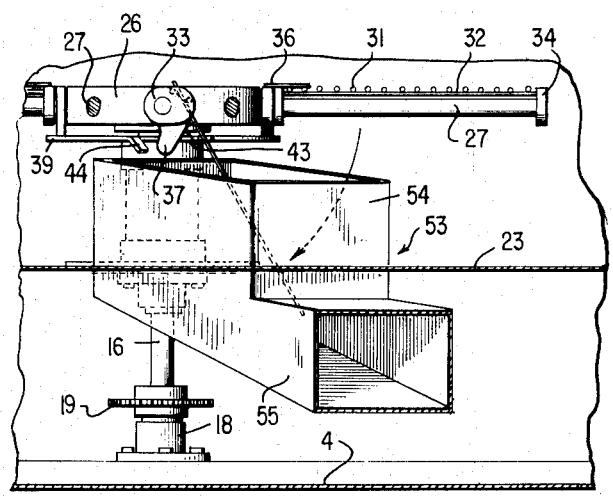
FIGURE 5 is a view taken along line 5—5 of FIGURE 4.

As will be seen in FIGURES 4 and 5, the cam ring 39 is provided with an arcuate cut-out portion 43 and an inclined finger 44 formed on the ring edge adjacent one end of the cutout portion. By the construction and arrangement of the cam ring and follower, it will be seen that as the hub 26 is rotated in a clockwise direction, the fingers 36 rest upon the upper surface of the cam followers 37 which, in turn, engage the upper surface of the cam ring 39 to maintain their respective grid segments 30 in a horizontal plane; however, as each cam follower 37 and its associated grid segment arrive at the cut-out portion 43 in the cam ring, the lower edge portion 38 of the follower drops through the cut-out portion, allowing the respective grid to pivot downwardly about the spoke, as shown in FIGURE 5. As the hub 26 continues to rotate the lower edge portion 38 of the cam follower engages the inclined finger 44 and rides upwardly thereon, thereby causing the cam follower to rotate about the spoke and engage the finger 36, whereby the stringer 32 and associated grid segment 30 pivot upwardly so that the grid segment is once again positioned in a horizontal plane. The design of cam ring 39 is such that the grid segments 30 are maintained in a horzontal plane as the hub rotates through an angle of approximately 315° and each grid segment is allowed to remain in the downward or "drop" position while the hub rotates through an angle of approximately 45°.

Referring to FIGURES 3 and 4, the upper and lower heating elements 12 each comprise a pair of arcuate shaped Calrods 45 and 46. Calrod 45 has a plurality of convolutions disposed in a sinuous configuration extending apporximately 180° around the food carrying surface 13 in proximity to the hub member 26; Calrod 46 having a similar configuration but with fewer convolutions and being positioned in a horizontal plane further from the food carrying surface than Calrod 45 and extending approximately 90° around said surface in proximity to the periphery thereof. The ends 45' and 46' of the Calrods are connected to a control box 47 mounted on the side wall 3 of the housing, said control box being connected to the off-on switch 15 carried by the front panel 10 of the housing. By the construction and arrangement of the Calrods with respect to the rotary food carrying surface, the food which is to be cooked at a relatively high temperature and for an extended period of time is placed on the grids in proximity to the hub portion to thereby be heated by Calrods 45 and food which is to be merely heated or cooked ata relatively low temperature for a brief period is placed on the food carrying surface in proximity to the periphery thereof to thereby be heated by Calrod 46.

In order to collect grease drippings from the foodstuff and to convey the accumulated grease from the machine, a pan 48 (FIGURES 3 and 6) is carried by the partition 23, said pan being positioned below the lower heating elements 12 and extending through an area covering approximately one-half of the partition 23. One side of the pan is provided with an aperture 49 which communicates with a duct 50 extending outwardly from the side wall 2 of the housing and the opposite side of the pan is similarly provided with an aperture 51 which communicates with a duct 52 extending outwardly through the front panel 10 of the housing.

A chute 53 (FIGURE 5) is provided beneath the food carrying surface adjacent the cam ring cut-out portion 43 for conveying the heated or cooked foodstuff away from the machine, said chute comprising a rectangular-shaped box portion 54 extending upwardly from partition 23 and a duct portion 55 extending below the partition and outwardly through the side wall 2 of the housing, the upper open end portion of the box being of sufficient size to allow each grid segment to enter therein as it reaches the cut-out portion in the cam ring.

In order to clear away any foodstuff that might accidentally adhere to a grid segment after it has passed the discharge position, and to clean the respective grids after the foodstuff has been discharged therefrom, a scraper assembly 55 (FIGURE 4) is provided adjacent the food carrying surface and carried by the cooking machine housing in proximity to the inclined finger portion 44 of the cam ring. The scraper assembly 55 comprises a frame member 56 secured to the machine housing, said frame member being provided with a pair of perforated arms 57, 58 projecting from either side thereof. The arms 57 adjacent the chute 53 are adapted to carry a clearing scraper 59 consisting of a depending brush, whereby any foodstuff that might accidentally adhere to the grid will be brushed into the conveyer chute 53. The arms 58 on the opposite side of the frame member are adapted to carry a scraper blade 60, whereby as each grid segment is raised to a horizontal position its surface is scraped prior to the placing of an uncooked foodstuff thereon.

In the operation of the cooking machine, the rheostat control knob 14 is actuated to energize motor 20 to cause rotation of the food carrying surface at the proper speed and the power switch 15 is turned to on position to energize the heating elements 12. A foodstuff to be prepared, such as hamburger or hot dog sandwiches, are placed on the portion 13' of the rotating food carrying surface extending outwardly from the hood, the meat to be cooked being positioned on each grid segment 30 in proximity to the hub member 26 and the bread to be heated is placed on the same grid segment adjacent the outer radial edge thereof. As the food carrying surface passes under the hood 5, the Calrods 45 cook the meat and the Calrods 46 heat the bread, the spatial relationship between the food carrying surface and the heating elements, and the speed at which the food carrying surface rotates being such that by the time each grid arrives at the cut-out portion 43 in the cam ring, the heat is properly cooked and the bread sufficiently heated. At this point the grid segment is pivoted as shown in FIGURE 5 to thereby drop the cooked meat and heated bread into the chute 53 where they are discharged from the machine. The food carrying surface continues rotating while each grid segment is scraped and returned to its horizontal position, as described herein above, and the process is then repeated.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. In a cooking machine for the preparation of food stuff in relatively large quantities, a food carrying assembly including a rotatable food supporting surface comprising a plurality of grid elements, drive means for rotating said food supporting surface, heating members positioned above and below the food supporting surface, each of the upper and lower heating members comprising a pair of arcuate shaped elements, one of the elements extending substantially 180° around the food supporting surface in proximity to the center thereof, the other element being positioned further from the food supporting surface than the first mentioned element and extending substantially 90° around the food supporting surface in proximity to the periphery thereof, said food supporting surface including means for discharging a cooked foodstuff therefrom, and conveyor means positioned beneath the food supporting surface adjacent the foodstuff discharging means for conveying the cooked foodstuff from the machine.

2. In a cooking machine for the preparation of foodstuffs in relatively large quantities, a housing, a horizontally disposed partition mounted within the housing, a rotatably mounted drive shaft extending through the partition, drive means operatively connected to said drive shaft, a food supporting surface carried by the drive shaft, heating members positioned above and below the food supporting surface, each of the upper and lower heating members comprising a pair of arcuate shaped elements, one of the elements extending substantially 180° around the food supporting surface in proximity to the center thereof, the other element being positioned further from the food supporting surface than the first mentioned heating element and extending substantially 90° around the food supporting surface in proximity to the periphery thereof, said food supporting surface comprising a hub secured to the upper end of the rotatable drive shaft, a plurality of spokes extending radially outward from the hub, a grid segment secured to each spoke on the trailing edge thereof, a cam follower journalled to each spoke adjacent the peripheral edge of the hub, each grid segment being operatively connected to a respective cam follower, a stationary cam ring positioned beneath the food supporting surface, said cam follower having a depending finger abutting the cam ring to thereby maintain each grid segment in a horizontal plane, a cut-out portion formed in the cam ring whereby, during rotation of the food carrying surface, as each cam follower and its associated grid segment arrive at the cut-out portion, the grid segment pivots out of the horizontal plane to thereby discharge the cooked foodstuff therefrom.

3. A cooking machine according to claim 2, wherein the upper and lower heating members comprise, a pair of arcuate shaped Calrods.

4. In a cooking machine for the preparation of foodstuffs in relatively large quantities, a food carrying assembly comprising a hub member secured to a rotatably mounted shaft, drive means operatively connected to the shaft, a plurality of spokes extending radially outward from the hub member, a grid segment pivotally connected to each of the spokes on the trailing edge thereof, the grid segments defining with the spokes a substantially continuous, co-planar food supporting surface, heating members positioned above and below said food supporting surface, each of the upper and lower heating members comprising a pair of arcuate shaped elements, one of the elements extending substantially 180° around the food carrying surface in proximity to the center thereof, the other element being positioned further from the food supporting surface than the first mentioned element and extending substantially 90° around the food supporting surface in proximity to the periphery thereof, the food carrying assembly incorporating means for discharging cooked foodstuff from the grid segments, and conveyor means positioned beneath the food supporting surface adjacent the foodstuff discharging means for conveying the cooked foodstuff from the machine.

References Cited by the Examiner

UNITED STATES PATENTS

| | | | |
|---|---|---|---|
| 580,753 | 4/97 | Barnard | 99—400 X |
| 1,599,556 | 9/26 | Cook | 99—386 |
| 1,631,655 | 6/27 | Sunderland et al. | 99—427 |
| 2,168,773 | 8/39 | Parr | 99—386 X |
| 2,542,265 | 2/51 | Staples | 99—400 X |
| 2,614,485 | 10/52 | Sinkwitz et al. | 99—404 |
| 2,853,193 | 9/58 | Crumb | 99—427 X |
| 2,920,177 | 1/60 | Brane. | |

WALTER A. SCHEEL, *Primary Examiner.*

JEROME SCHNALL, ROBERT E. PULFREY,
*Examiners.*